(12) United States Patent
Pusheck

(10) Patent No.: US 10,605,686 B2
(45) Date of Patent: Mar. 31, 2020

(54) DUAL WET AND DRY COMBINATION MOUNTING

(71) Applicant: Autoliv ASP, Inc., Ogden, UT (US)

(72) Inventor: Jacob Pusheck, Waterford, MI (US)

(73) Assignee: VEONEER US, INC., Southfield, MI (US)

( * ) Notice: Subject to any disclaimer, the term of this patent is extended or adjusted under 35 U.S.C. 154(b) by 335 days.

(21) Appl. No.: 15/788,800

(22) Filed: Oct. 19, 2017

(65) Prior Publication Data

US 2019/0120714 A1 Apr. 25, 2019

(51) Int. Cl.
- *G01L 19/14* (2006.01)
- *G01D 11/24* (2006.01)
- *B60R 11/00* (2006.01)

(52) U.S. Cl.
CPC .......... *G01L 19/147* (2013.01); *B60R 11/00* (2013.01); *G01D 11/245* (2013.01)

(58) Field of Classification Search
CPC ...... G01L 19/147; B60R 11/00; G01D 11/245
USPC .......................................................... 73/756
See application file for complete search history.

(56) References Cited

U.S. PATENT DOCUMENTS

| | | | |
|---|---|---|---|
| 6,244,287 B1 * | 6/2001 | Hill | B08B 1/04 134/166 C |
| 7,291,023 B1 | 11/2007 | Still et al. | |
| 7,380,458 B1 | 6/2008 | Date et al. | |
| 8,581,116 B2 * | 11/2013 | Ludwig | B60R 16/0239 174/138 G |
| 8,707,783 B2 * | 4/2014 | Ludwig | G01D 11/245 73/431 |
| 9,003,891 B2 * | 4/2015 | Frank | G01D 11/30 403/288 |
| 9,260,071 B2 | 2/2016 | Murray, Jr. et al. | |
| 9,709,425 B2 | 7/2017 | Matsui et al. | |
| 2009/0199647 A1 * | 8/2009 | Hadjiloucas | G01L 13/025 73/716 |
| 2014/0182376 A1 * | 7/2014 | Watanabe | G01C 21/16 73/510 |
| 2016/0061682 A1 * | 3/2016 | Ramsay | G01L 19/0069 73/706 |

OTHER PUBLICATIONS

International Search Report, International Application No. PCT/US2018/056274, dated Dec. 20, 2018, 3 pgs.

* cited by examiner

*Primary Examiner* — Nathaniel T Woodward
(74) *Attorney, Agent, or Firm* — Dickinson Wright PLLC

(57) ABSTRACT

A mountable sensor assembly for mounting on the sheet metal panel of a vehicle. The mountable sensor assembly may include a sensor circuit and a sensor housing assembly. The sensor housing assembly may include a first mounting surface, a second mounting surface, and a connector. The first mounting surface being on first side of the connector such that mounting first mounting surface to the dry side of the sheet metal panel would comprise a dry side mounting of the mountable sensor assembly, and mounting the second mounting surface to the wet side of the sheet metal panel would comprise a wet side mounting of the mountable sensor assembly.

20 Claims, 6 Drawing Sheets

DUAL WET AND DRY COMBINATION MOUNTING

BACKGROUND

The present application relates generally to sensor assembly that is configured to be mounted on either a wet side or a dry side of a vehicle panel.

BRIEF SUMMARY

In satisfying the above need, as well as overcoming the many drawbacks and other limitations of the related art, the present application provides a sensor assembly for combination wet side and dry side mounting. Specifically, the sensor housing may be designed for mounting on either the wet side of the sheet metal or the dry side of the sheet metal. As such, the mounting surface may be on either a first side of the housing assembly where only the pressure port extends through a hole in the sheet metal and the rest of the sensor assembly remains on the dry side of the sheet metal or the mounting surface is on a second side of the housing assembly where the entire housing assembly is mounted on the wet side of the sheet metal.

The mountable sensor assembly may include a sensor circuit and a sensor housing assembly. The sensor housing assembly may include a first mounting surface, a second mounting surface, and a connector. The first mounting surface being on first side of the connector such that mounting the sensor housing using the first mounting surface would comprise a wet side mounting of the mountable sensor assembly and mounting the sensor housing using the second mounting surface would comprise a dry side mounting of the mountable sensor assembly.

Further objects, features and advantages of this application will become readily apparent to persons skilled in the art after a review of the following description, with reference to the drawings and claims that are appended to and form a part of this specification.

BRIEF DESCRIPTION OF THE DRAWINGS

In the accompanying drawings the components are not necessarily to scale, emphasis instead being placed upon illustrating the principles of the application. Moreover, like reference numerals designate corresponding parts throughout the views.

DETAILED DESCRIPTION

Currently there are two options for the location to mount a pressure sensor. They can be mounted on the dry side of a vehicle door panel and have a pressure port protruding into the wet side for pressure transmission, or the sensor assembly can be located entirely on the wet side of the door panel. This methodology necessitates two separate designs to accommodate both mounting types. However, the implementations discussed herein improve upon this sub-optimal design by allowing for a single housing to be mounted on either the wet side or the dry side of a door panel This allows for a more singular design approach and increased volume on that single design. The implementations provided include a "snap fit" configuration for assembly but other methods of assembling the components may be readily used. Various different methods of assembly may include (laser weld, vibration weld, potting, etc.)

One feature of the described implementations is a mounting configuration that allows for pressure sensing regardless of desired mounting location (wet side or dry side). This configuration may involve mounting surfaces extending out to the edge of the package to allow for mating with the vehicle sheet metal on both sides of the housing assembly. The dual wet side and dry side mounting allows for the number of pressure sensor designs to be reduced from two separate wet side and dry side designs to one single design.

Another feature of the described implementations may be the use of countersunk holes to allow for a shorter mounting bolt to be used to attach this sensor assembly to the vehicle (from both sides). The countersunk holes allow for the use of shorter (less expensive) mounting bolts to be used to attach this sensor assembly to the vehicle.

As such, the designs discussed could be sold to all OEMs that use pressure sensors with wet side mounting or dry side mounting configurations.

Figure 1:
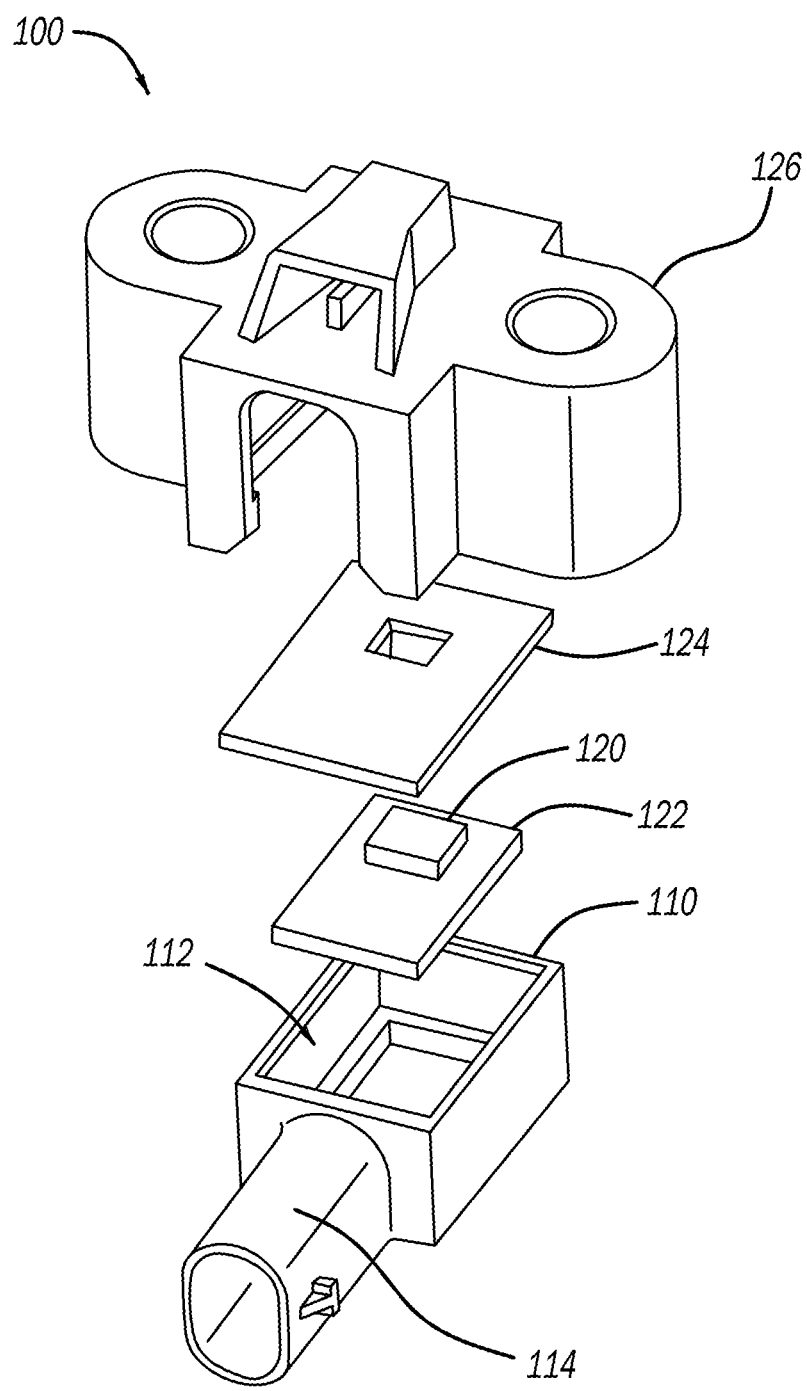
FIG. 1 illustrates an exploded view of sensor assembly.

FIG. 1 illustrates an exploded view of sensor assembly 100. The sensor assembly 100 includes a housing 110, a sensor 120, a gasket 124 and a cover 126. The sensor assembly 100 may be attached to a sheet metal panel 400 of the vehicle. As such, the sensor 120 may be an accelerometer, gyroscope, pressure sensor, sound sensor, or other vehicle safety sensor. The housing 110 may include a cavity 112 to receive the sensor 120. In some implementations, the sensor 120 may be attached to a printed circuit board 122. In other implementations, the sensor 120, such as a PCB-less sensor package, may be mounted directly into the housing 110. The housing 110 may also include a connector portion 114 for connection to a vehicle wire harness assembly. As such, the sensor 110 may be electrically connected to pins located within the connector portion 114. The gasket 124 may be located between the sensor 120 and the cover 126. As the cover is seated on the housing 110, the gasket 124 may provide sealing between the cover 126 and the housing 110 preventing moisture or other elements to travel into the cavity 112. The cover 126 and the housing 110 may include one or more snap fit features to retain the housing 110 within the cover 126.

Figure 2:
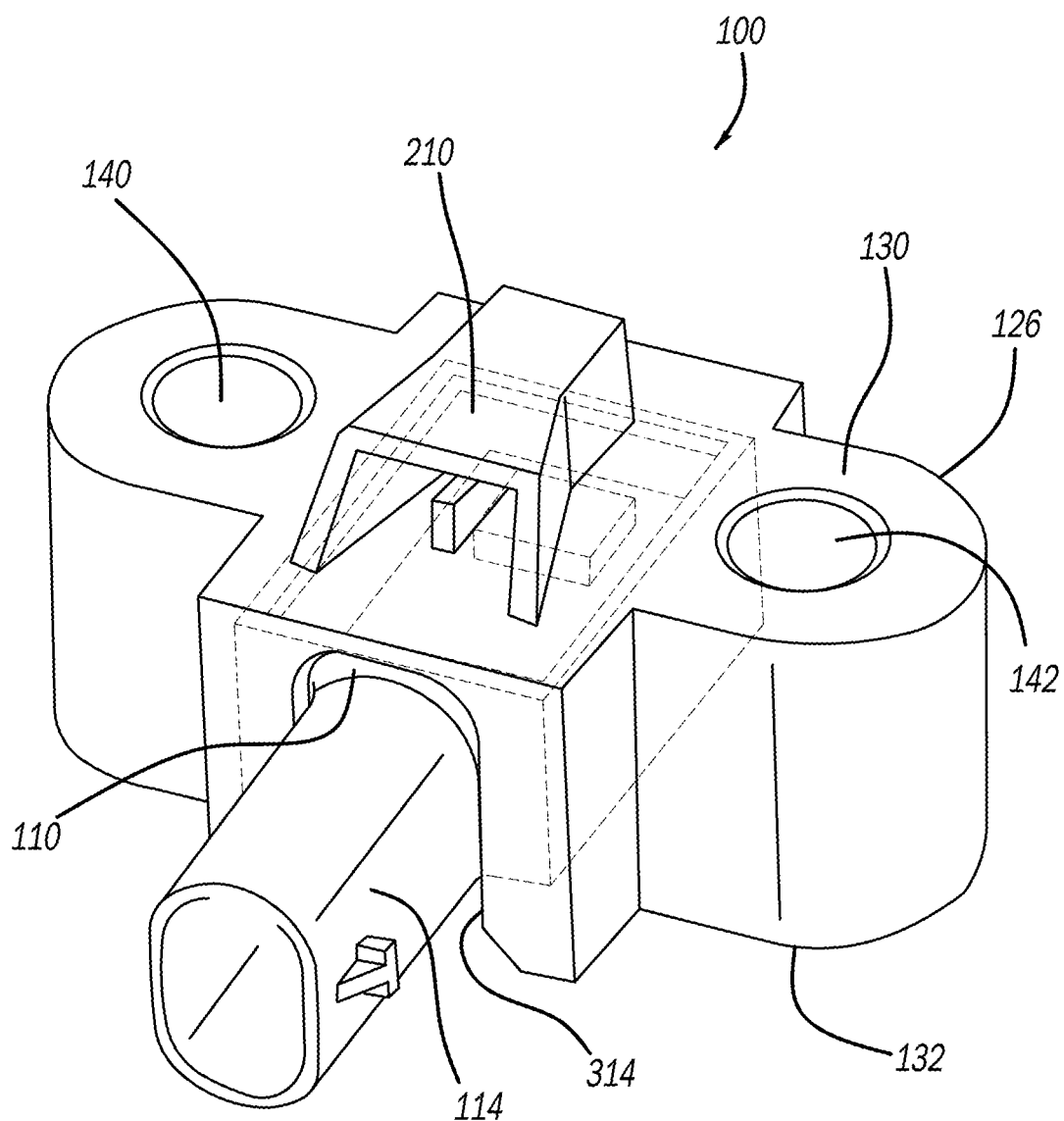
FIG. 2 is an assembled perspective view of the sensor assembly.

FIG. 2 is an assembled perspective view of the sensor assembly 100. The connector portion 114 of the housing 110 extends through a slot 314 in the cover 126. Together the housing 110 and the cover 126 may form a housing assembly. The cover 126 includes a first mounting surface 130 and a second mounting surface 132. The first mounting surface 130 may be planar and may extend across substantially the entire cover 126. The second mounting surface 132 may also be planar and may extend across substantially the entire cover 126. The first mounting surface 130 may be on the opposite side of the cover 126 from the second mounting surface 132 and may face in an opposite direction from the second mounting surface 132. The first mounting surface 130 may extend substantially parallel to the second mounting surface 132. The first mounting surface 130 may be configured for use as a wet side mounting surface. The second mounting surface 132 may be configured for use as a dry side mounting surface.

A pressure port 210 may extend from the first mounting surface 130 such that when the first mounting surface 130 is mounted against a dry side 412 of the sheet metal panel 400 of the door, the pressure port 210 may extend through an opening 416 in the sheet metal panel 400 and allow communication to a wet side 410 of the sheet metal panel 400. When the second mounting surface 132 is mounted against the wet side 410 of the sheet metal panel 400, both the pressure port 210 and the connector portion 114 may be located on the same side, the wet side 410, of the sheet metal panel 400. For example, both the connector 114 and the pressure port 210 may be located in the wet area or the external side of the sheet metal.

The cover 126 may be provided with two mounting holes 140 and 142. In some standards, a mounting hole may be expected to have a certain relative position to a connector 114. To maintain the expected geometric configuration between the mounting hole and the connector 114 position, mounting hole 140 may be used with one of the two mounting surfaces 130, 132 while mounting hole 142 may be used with the other of the two mounting surface 130, 132. However, in some implementations, both mounting holes 140, 142 may be used if maintaining the standard geometric configuration is not of particular concern.

Figure 3:
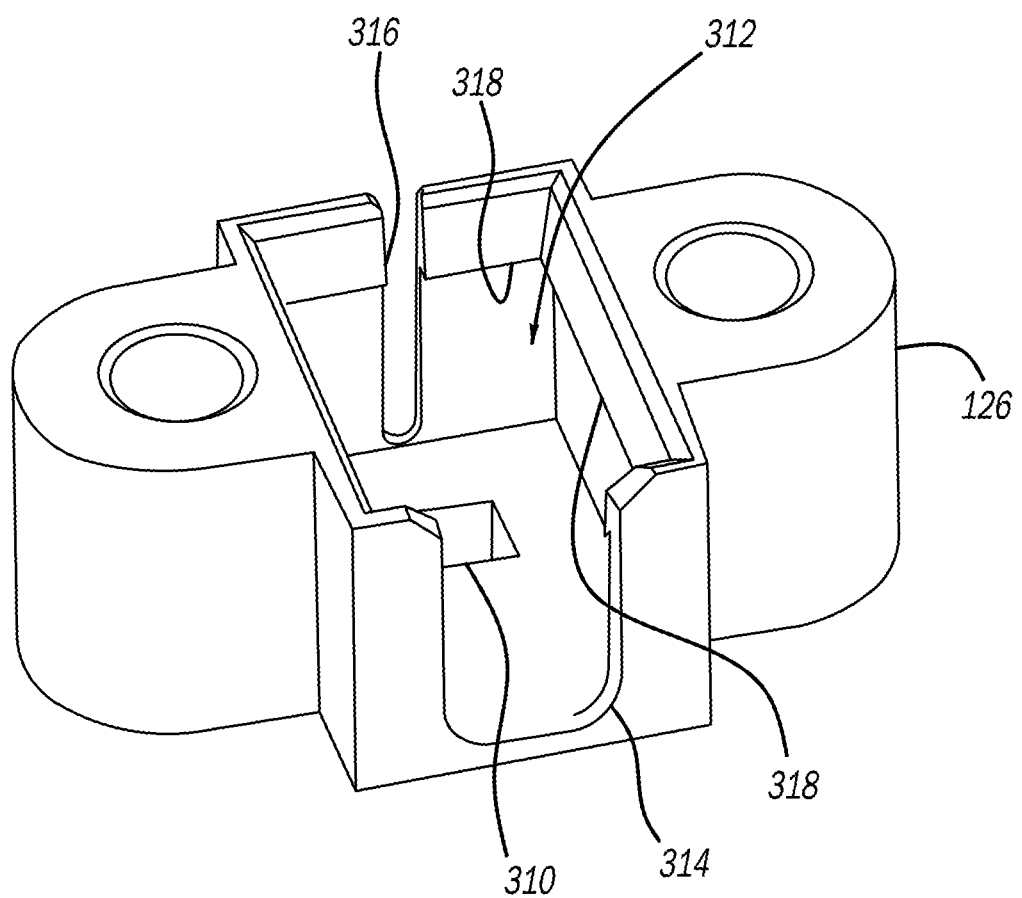
FIG. 3 is an perspective view of a cover of the sensor assembly.

FIG. 3 is an perspective view of the cover 126. The cover 126 includes an opening 312 for receiving the housing 110. Edges of the cover 126 around the opening 312 may be chamfered to center the housing in the opening 312. The cover may have an inner opening 310 that coordinates with the pressure port, providing access to the sensor 120 within the housing 110. Further, the connector 114 may extend through the slot 314 provided in the cover 126. In some implementations, a slot 316 may be provided to provide stress relief as the housing 110 may be snap fit into the opening 312 by locking features 318 located around the outer edge of the opening 312. The locking features 318 may engage the housing 110 and lock the position and orientation of the housing 110 relative to the cover 126.

Figure 4A:
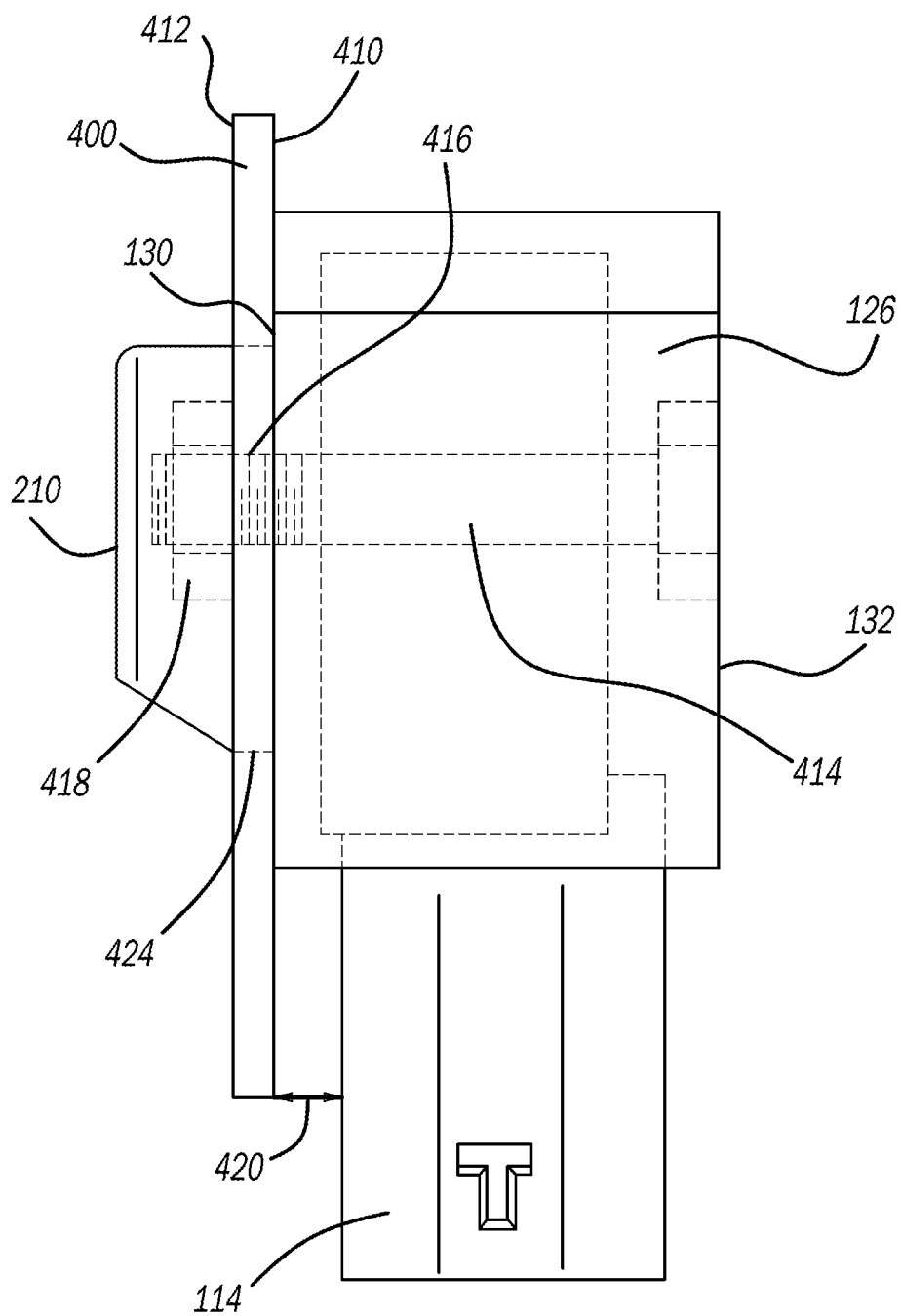
FIG. 4A is an illustration showing the position of the sensor assembly in a wet side mounting scenario.

FIG. 4A is an illustration showing the position of the sensor assembly in dry side mounting scenario, including the position of the sensor assembly 100 relative to the sheet metal panel 400 in a dry side mounting scenario. The first mounting surface 130 engages the dry side 410 of the sheet metal panel 400, and may be fastened to the sheet metal panel 400 using a fasteners 414 which may include screws, bolts or even clip lock mechanisms. The faster 414 may engage a nut 418 through an opening 416 in the sheet metal 410. The pressure port 210 may extend through an opening 424 in the sheet metal panel 400. In addition, a gap 420 is provided in-between the dry (inner) side 410 of the sheet metal panel 400 and the connector 114. The gap 420 provides room for attachment of the connector 114 to a wire harness assembly.

Figure 4B:
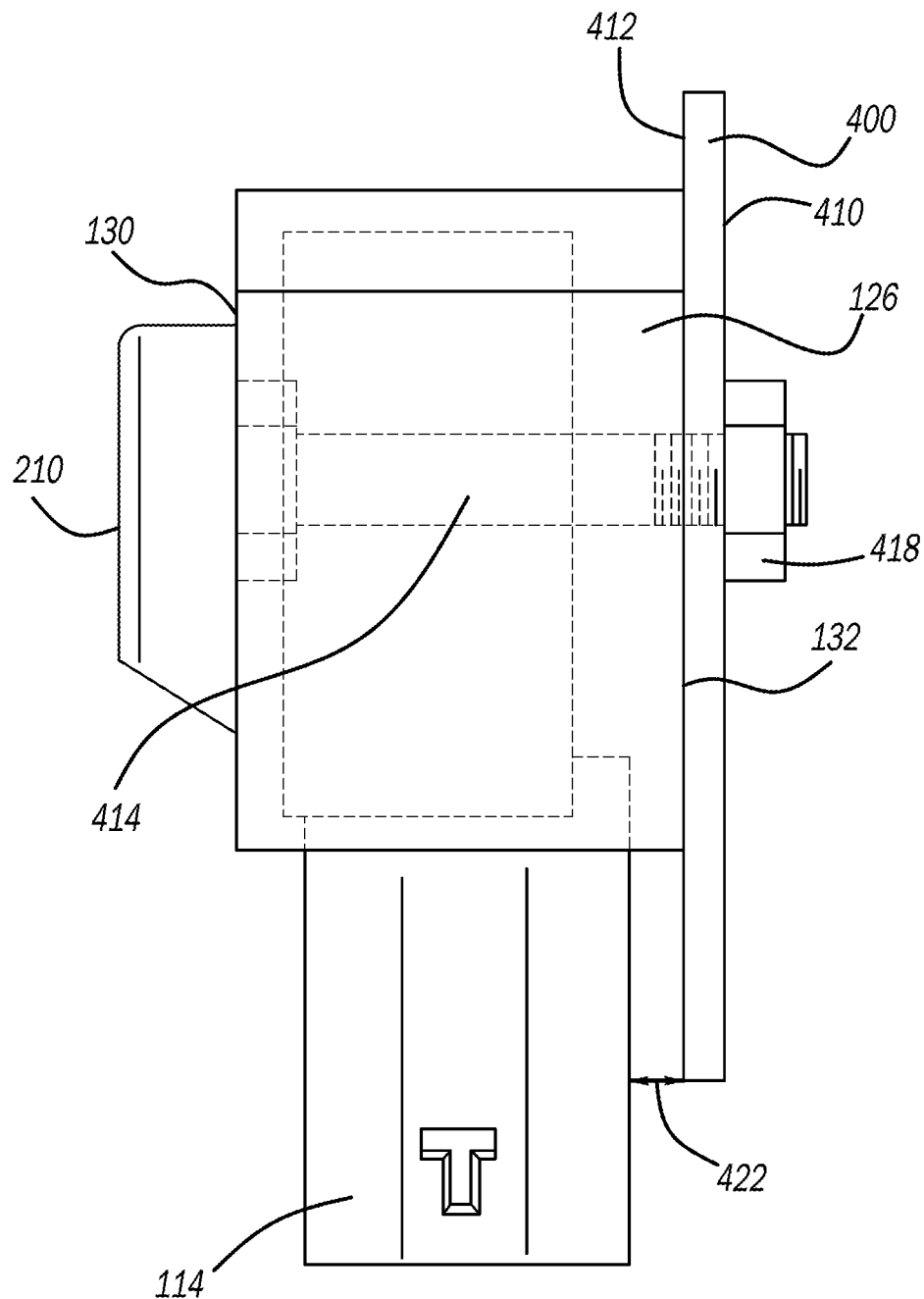
FIG. 4B is an illustration showing the position of the sensor assembly in dry side mounting scenario.

FIG. 4B illustrates the position of the sensor assembly 100 in a wet side mounting scenario, including the position of the sensor assembly 100 relative to the sheet metal panel 400 in a wet side mounting scenario. The second mounting surface 132 engages the wet (outer) side 412 of the sheet metal panel 400. Again, the position of the second mounting surface 132 relative to sheet metal panel 400 may be locked into place using a fastener 414, thereby locking the position and orientation of the sensor assembly 100 relative to the sheet metal panel 400. The faster 414 may engage a nut on an opposite end of the mounting hole. The position of the second mounting surface 132 provides a gap 422 between the wet (outer) side 412 of the sheet metal panel 400 and the connector surface 114. The gap 422 provides room for attachment of the wire harness to the connector 114.

The gap 420 and gap 422 may be a function of the standoff between the connector 114 and the first mounting surface 130 and the standoff between connector 114 and the second mounting surface 132. In addition, the first mounting surface 130 being parallel to the second mounting surface 132 may provide the minimum clearance when mounting on either surface. In addition, the connector 114 being locked into the opening of the housing in an orientation parallel with both the first mounting surface 130 and the second mounting surface 132 provides a symmetric geometry that may lend itself to both dry side mounting and wet side mounting scenarios. In some implementations, gap 420 (e.g. standoff) may be equal to the gap 422. In some implementations, the gap 420 and the gap 422 may be greater than 10 mm.

Certain mounting standards in the industry can specify the position of the connector 114 relative to the mounting holes 140, 142. As such, the cover 126 may be provided with two mounting holes 140, 142, one on each side of the cover 126. Accordingly, in the dry side mounting scenario, one of the two holes 140, 142 may be used in a wet side mounting scenario, and the other of the two holes 140, 142 may be used in a dry side mounting scenario, according to the standard. As such, the location and orientation of the first mounting hole 140 may correspond to a location and orientation defined in a standard relative to a position of the connector 114 with the first mounting surface 130 against the dry side 410 of sheet metal panel 400 (e.g. the dry side mounting scenario). Also, the location and orientation of the second mounting hole 142 may correspond to a location and orientation defined in a standard relative to a position of the connector 114 with the second mounting surface 132 against the wet side 412 of sheet metal panel 400.

Figure 5:
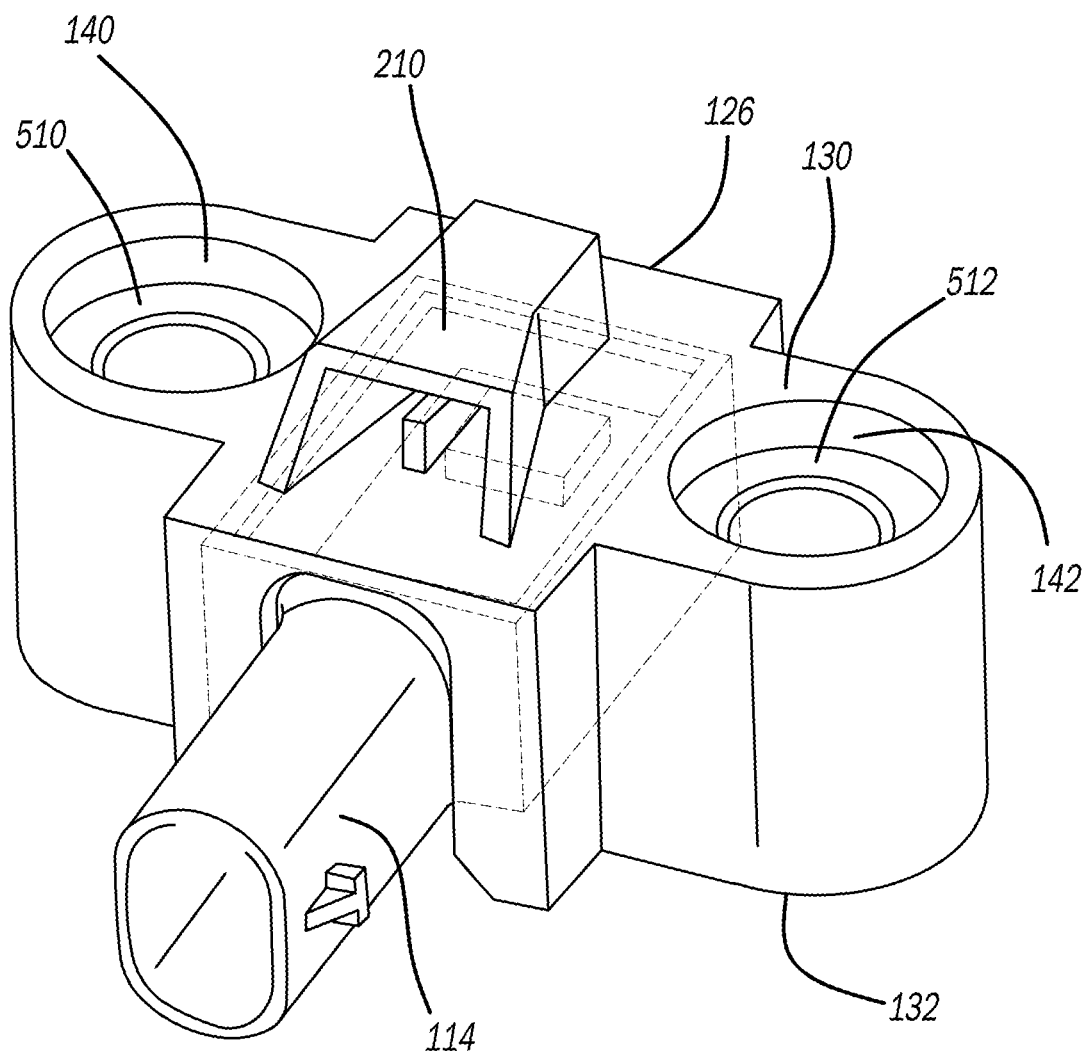
FIG. 5 is a perspective view illustrating one implementation of the sensor assembly with countersunk mounting holes.

FIG. 5 illustrates one implementation where the first mounting hole 140 and the second mounting hole 142 are countersunk, allowing for the bolt head to be recessed into the cover 126 and a shorter bolt to be used for fastening the assembly to the sheet metal. Further, the bolt head may be flush to the mounting surface 130 of the cover 126 after installation. Both the first and second mounting holes 140 and 142 may be countersunk on one or both of the first mounting surface 130 and/or the second mounting surface 132. For example, the first mounting hole 140 may be countersunk on one or both of the first mounting surface 130 and the second mounting surface 132. As such, a shoulder 510 of the counter bore may be engaged by the fastener 414. Similarly, the second mounting hole 142 may be countersunk on one or both of the first mounting surface 130 and the second mounting surface 132. As such, a shoulder 512 may be engaged by the faster 414.

As a person skilled in the art will readily appreciate, the above description is meant as an illustration of the principles of this application. This description is not intended to limit the scope or application of the claim in that the assembly is susceptible to modification, variation and change, without departing from spirit of this application, as defined in the following claims.

What is claimed is:

1. A mountable sensor assembly for mounting on a sheet metal panel of a vehicle assembly, the sheet metal panel having a wet side and a dry side, the mountable sensor assembly comprising:

a sensor circuit; and a sensor housing assembly comprising a first mounting surface, a second mounting surface, and a connector, the first mounting surface being a first side of the connector such that mounting the sensor housing using the first mounting surface would comprise a dry side mounting of the mountable sensor assembly, and mounting the sensor housing using the second mounting surface would comprise a wet side mounting of the mountable sensor assembly.

2. The sensor assembly according to claim 1, wherein a pressure port is on the first mounting surface and configured to extend through an opening in the sheet metal.

3. The sensor assembly according to claim 1, wherein the first mounting surface is parallel to the second mounting surface.

4. The sensor assembly according to claim 1, wherein the connector is parallel to the first mounting surface and the second mounting surface.

5. The sensor assembly according to claim 1, wherein the cover has a first mounting hole on a first side of the connector and a second mounting hole on a second side of the connector.

6. The sensor assembly according to claim 5, wherein the first mounting hole and the second mounting hole are countersunk.

7. The sensor assembly according to claim 1, wherein the first mounting surface is offset from the connector to a first standoff in a dry side mounting configuration and the second mounting surface is offset from the connector to provide a second standoff in a wet side mounting configuration.

8. The sensor assembly according to claim 7, wherein first standoff and the second standoff are greater than 10 mm.

9. The sensor assembly according to claim 7, further comprising a gasket positioned between the housing and the cover.

10. A mountable sensor assembly for mounting on sheet metal of a vehicle assembly, the sheet metal panel having a wet side and a dry side, the mountable sensor assembly comprising:
   a sensor circuit;
   a sensor housing comprising a cavity configured to receive the sensor circuit and a connector;
   a cover configured to extend over the sensor housing, the cover comprising a first mounting surface and a second mounting surface, the first mounting surface being on a first side of the connector such that mounting the first mounting surface of the sensor housing to a dry side of the sheet metal panel would comprise a dry side mounting of the mountable sensor assembly, and mounting the second surface of the sensor housing to the wet side of the sheet metal panel would comprise a wet side mounting of the mountable sensor assembly; and
   a gasket positioned between the cover and the sensor housing to seal the cavity.

11. The sensor assembly according to claim 10, wherein the cover is snap fit onto the sensor housing.

12. The sensor assembly according to claim 10, wherein a pressure port is on the first mounting surface and configured to extend through an opening in the sheet metal when in the dry side mounting configuration.

13. The sensor assembly according to claim 10, wherein the first mounting surface extends parallel to the second mounting surface.

14. The sensor assembly according to claim 10, wherein the connector is parallel to the first mounting surface and the second mounting surface.

15. The sensor assembly according to claim 10, wherein the cover has a first mounting hole on a first side of the connector and a second mounting hole on a second of the connector.

16. The sensor assembly according to claim 15, wherein the first mounting hole and the second mounting hole are countersunk.

17. The sensor assembly according to claim 10, wherein the first mounting surface is offset from the connector to a first standoff in a dry side mounting configuration and the second mounting surface is offset from the connector to provide a second standoff in a wet side mounting configuration.

18. The sensor assembly according to claim 17, wherein first standoff and the second standoff are greater than 10 mm.

19. The sensor assembly according to claim 17, wherein first standoff and the second standoff are equal.

20. A mountable sensor assembly for mounting on sheet metal of a vehicle assembly, the sheet metal having a wet side and a dry side, the mountable sensor assembly comprising:
   a sensor circuit;
   a sensor housing comprising a cavity configured to receive the sensor circuit and an connector;
   a cover configured to extend over the sensor housing, the cover comprising a first mounting surface and a second mounting surface, the first mounting surface being of first side of the connector such that mounting the sensor housing using the first mounting surface would comprise a wet mounting of the mountable sensor assembly and mounting the sensor housing using the second mounting surface would comprise a dry mounting of the mountable sensor assembly, wherein the cover has a first mounting hole on a first side of the connector and a second mounting hold on a second of the connector, wherein the first mounting surface is offset from the connector to a first standoff between the electrical connector and the sheet metal in a wet mounting configuration and the second mounting surface is offset from the connector to provide a second standoff between the electrical connector and the sheet metal in a dry mounting configuration; and
   a gasket positioned between the sensor housing and the cover to seal the cavity.

* * * * *